US010210004B2

(12) United States Patent
Riedisser et al.

(10) Patent No.: US 10,210,004 B2
(45) Date of Patent: Feb. 19, 2019

(54) METHOD OF PROVIDING AT LEAST ONE DATA CARRIER FOR A COMPUTER SYSTEM AND COMPUTER SYSTEM INCLUDING SERVICE PROCESSOR INDEPENDENTLY OPERABLE FROM A MAIN PROCESSOR OF THE COMPUTER SYSTEM

(71) Applicant: FUJITSU LIMITED, Kawasaki-shi (JP)

(72) Inventors: Jochen Riedisser, Augsburg (DE); Michael Koob Spijkerman, Paderborn (DE)

(73) Assignee: FUJITSU LIMITED, Kawasaki (JP)

( * ) Notice: Subject to any disclaimer, the term of this patent is extended or adjusted under 35 U.S.C. 154(b) by 623 days.

(21) Appl. No.: 14/718,263

(22) Filed: May 21, 2015

(65) Prior Publication Data
US 2016/0328250 A1 Nov. 10, 2016

(30) Foreign Application Priority Data

May 5, 2015 (DE) .................... 20 2015 102 285 U

(51) Int. Cl.
*G06F 9/455* (2018.01)
*G06F 9/4401* (2018.01)

(52) U.S. Cl.
CPC ............ *G06F 9/455* (2013.01); *G06F 9/4411* (2013.01); *G06F 9/45558* (2013.01); *G06F 2009/45579* (2013.01)

(58) Field of Classification Search
None
See application file for complete search history.

(56) References Cited

U.S. PATENT DOCUMENTS 7,484,084 B1  1/2009 Ranaweera et al.
8,260,841 B1  9/2012 Maity
(Continued)

FOREIGN PATENT DOCUMENTS

JP  2001075786 A  3/2001
JP  2003173260 A  6/2003
(Continued)

OTHER PUBLICATIONS

USPTO, [Nahar], Corrected Notice of Allowability dated Aug. 1, 2017 in related U.S. Appl. No. 14/707,038 [allowed].
(Continued)

*Primary Examiner* — Saif A Alhija
(74) *Attorney, Agent, or Firm* — Fujitsu Patent Center

(57) ABSTRACT

A method of providing at least one data carrier for a computer system includes downloading at least one image of a data carrier from a predetermined network source by a service processor of the computer system, the service processor being operable independently of a main processor and an operating system of the computer system; storing, by the service processor, the at least one downloaded image in a non-volatile bulk memory; incorporating, by the service processor, the at least one stored image as active data carrier of a virtual memory drive; and emulating a standard interface that accesses the virtual memory drive such that an operating system can access the active data carrier without manufacturer-specific driver software.

18 Claims, 4 Drawing Sheets

(56) References Cited

U.S. PATENT DOCUMENTS

| | | | |
|---|---|---|---|
| 2002/0092008 A1 | 7/2002 | Kehne et al. | |
| 2004/0093592 A1 | 5/2004 | Rao | |
| 2004/0205779 A1 | 10/2004 | Almeida et al. | |
| 2005/0278583 A1* | 12/2005 | Lennert | G06F 11/1461 714/43 |
| 2008/0077711 A1 | 3/2008 | Cepulis | |
| 2010/0250825 A1 | 9/2010 | Chen et al. | |
| 2011/0047340 A1* | 2/2011 | Olson | G06F 11/1456 711/162 |
| 2011/0154313 A1 | 6/2011 | Nolterieke et al. | |
| 2011/0197055 A1 | 8/2011 | Spottswood et al. | |
| 2012/0198434 A1 | 8/2012 | Distine et al. | |
| 2013/0007437 A1 | 1/2013 | Shroni et al. | |
| 2014/0337004 A1 | 11/2014 | Maity et al. | |
| 2015/0149815 A1 | 5/2015 | Maity et al. | |
| 2015/0178096 A1* | 6/2015 | Inbaraj | G06F 9/4416 713/2 |
| 2015/0373038 A1 | 12/2015 | Blackwell | |

FOREIGN PATENT DOCUMENTS

| | | | |
|---|---|---|---|
| JP | 2011070674 A | | 4/2011 |
| JP | 2012053869 A | | 3/2012 |
| JP | 2014093075 A | | 5/2014 |
| JP | 2015060411 A | * | 3/2015 |

OTHER PUBLICATIONS

USPTO, [Qamrun Nahar], Non-Final Rejection dated Mar. 24, 2016 in related U.S. Appl. No. 14/707,038.
USPTO, [Qamun Nahari], Final Rejection dated Sep. 29, 2016 in related U.S. Appl. No. 14/707,038.
USPTO, [Qamrun Nahari], Advisory Action dated Dec. 19, 2016 in related U.S. Appl. No. 14/707,038.
USPTO, [Paulino], Final Rejection dated Dec. 14, 2016 in related U.S. Appl. No. 14/713,017.
USPTO, [Paulino], Non-Final Rejection dated Jun. 16, 2016 in related U.S. Appl. No. 14/713,017.
USPTO, [Paulino], Non-Final Rejection dated Jun. 14, 2017 in related U.S. Appl. No. 14/713,017.
USPTO, [Nahar], Notice of Allowance dated May 22, 2017 in related U.S. Appl. No. 14/707,038.
USPTO, [Paulino], Advisory Action dated Mar. 7, 2017 in related U.S. Appl. No. 14/713,017.
USPTO, [Paulino], Final Office Action dated Dec. 13, 2017 in related U.S. Appl. No. 14/713,017 [pending].
USPTO, [Paulino], Advisory Action dated Mar. 1, 2018 in related U.S. Appl. No. 14/713,017 [pending].
USPTO, [Paulino], Applicant Initiated Interview Summary and Examiner Interview Summary Record dated Feb. 7, 2018 in related U.S. Appl. No. 14/713,017 [pending].
USOA—USPTO, [Paulino], Non-Final Rejection dated Oct. 29, 2018 for related U.S. Appl. No. 14/713,017.

* cited by examiner

METHOD OF PROVIDING AT LEAST ONE DATA CARRIER FOR A COMPUTER SYSTEM AND COMPUTER SYSTEM INCLUDING SERVICE PROCESSOR INDEPENDENTLY OPERABLE FROM A MAIN PROCESSOR OF THE COMPUTER SYSTEM

TECHNICAL FIELD

This disclosure relates to a method of providing at least one data carrier for a computer system, wherein at least one image of a data carrier is downloaded from a predetermined network source. The disclosure also relates to a computer system and a memory device having executable program code stored thereon that performs such a method.

BACKGROUND

Methods of providing data carriers from a downloaded image are known. So-called images of data carriers originally originate from the development of virtual machines, wherein individual or all resources of a computer system are virtualized. An image of a data carrier is understood to mean, in particular, a file with structured information stored therein, the information corresponding to the content of an emulated data carrier, for example, a partition of a bulk memory drive such as of a hard disk, for example, or of a CD or DVD drive. Such images have largely been standardized particularly for storage media with standardized file systems such as CDs or DVDs on the basis of ISO Standard 9660. Such a standard-conforming image of a data carrier can be used by a multiplicity of computer systems and software applications in the same way as a storage medium having the same content which is inserted into a corresponding physical drive of the computer system.

Standardization of images of data carriers and compatibility with existing software programs produced by the virtualization of corresponding drives have resulted in images of data carriers also being used outside the virtual machines. In particular, they are used in many cases to install software. This first involves compiling an image of a data carrier with all data required for the installation. Afterward, the created image is incorporated as a virtual drive on a computer on which the software is intended to be installed.

What is problematic about such an approach is, in particular, that images of virtual drives are generally very large, for example, a few gigabytes. Accordingly, transmission of such an image to a computer system via a data network takes a comparatively long time. Furthermore, storage of such an image on a bulk memory of the computer system occupies a comparatively large memory area.

Therefore, it could be helpful to provide improved methods of providing extensive data for a computer system. The methods are intended to be suitable in particular for computer systems which are maintained remotely.

SUMMARY

We provide a method of providing at least one data carrier for a computer system including downloading at least one image of a data carrier from a predetermined network source by a service processor of the computer system, the service processor being operable independently of a main processor and an operating system of the computer system; storing, by the service processor, the at least one downloaded image in a non-volatile bulk memory; incorporating, by the service processor, the at least one stored image as active data carrier of a virtual memory drive; and emulating a standard interface that accesses the virtual memory drive such that an operating system can access the active data carrier without manufacturer-specific driver software.

We also provide a computer system including a main processor that executes an operating system; a service processor independently operable of the main processor and the operating system; and a first non-volatile bulk memory coupled to the service processor, wherein the service processor downloads at least one image of a data carrier from a predetermined network source and stores it in the first non-volatile bulk memory, incorporates the at least one stored image as active data carrier of a virtual memory drive of the computer system and emulates a standard interface that accesses the virtual memory drive such that an operating system can access the active data carrier without manufacturer-specific drive software.

We further provide a memory device having executable program code stored thereon, wherein execution of the program code by a service processor of a computer system involves at least steps being performed by the service processor: downloading at least one image of a data carrier from a predetermined network source; storing the at least one downloaded image in a non-volatile bulk memory; incorporating the at least one stored image as active data carrier of a virtual memory drive; and emulating a standard interface that accesses the virtual memory drive such that an operating system of the computer system can access the active data carrier without manufacturer-specific driver software.

Figure 1:
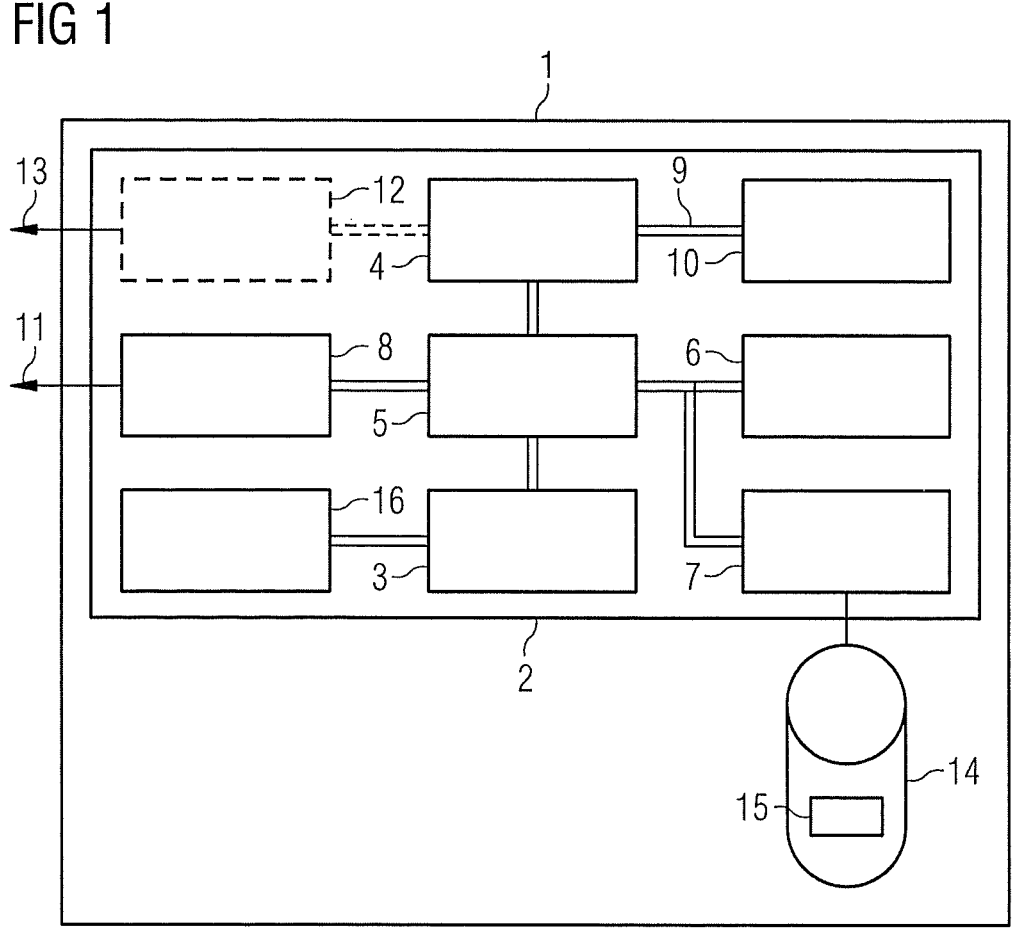
FIG. 1 shows a schematic illustration of a computer system.

LIST OF REFERENCE SIGNS 1 computer system
2 system component
3 main processor
4 service processor
5 chipset
6 basic input output system (BIOS)
7 input/output controller
8 (first) network controller
9 connection
10 memory card
11 data network
12 (second) network controller
13 management network
14 bulk memory drive
15 operating system
16 main memory
20 application framework library
21 XML library
22 database library
23 virtual memory media library
24 IPMI library 25 network interface
26 communication interface
27 PCIe interface
28 agent service
29 system monitoring component
30 RAID manager
31 update manager
32 installation manager
33 file system
34 data volume (image of a first data carrier)
35 data volume (image of a second data carrier)
36 data volume (image of a bootable data carrier)
37 inventory list
38 graphical user interface
40 Internet
41 (remote) network
42 firewall
43 management station
44 repository server
45 administrator
46 image

DETAILED DESCRIPTION

It will be appreciated that the following description is intended to refer to specific examples of structure selected for illustration in the drawings and is not intended to define or limit the disclosure, other than in the appended claims.

We provide a method of providing at least one data carrier for a computer system. The method may comprise the following steps:

downloading at least one image of a data carrier from a predetermined network source by a service processor of the computer system, the service processor being operable independently of a main processor and an operating system of the computer system;

storing, by the service processor, the at least one downloaded image in a non-volatile bulk memory;

incorporating, by the service processor, the at least one stored image as an active data carrier of a virtual memory drive; and emulating a standard interface that accesses the virtual memory drive such that an operating system can access the active data carrier without manufacturer-specific driver software.

The method uses a so-called service processor of the computer system to download an image of a data carrier from a network source. So-called server computers, in particular, often have a service processor that monitors the correct operation of the computer system. Such service processors are generally supplied with an operating voltage even if a main processor of the computer system is switched off or software running thereon is disturbed.

The service processor performs the comparatively lengthy processes of downloading and storing an image of a data carrier. In this way, the main processor and an operating system—running thereon—of the computer system are not disturbed by the downloading. In addition, the service processor undertakes incorporation of the stored image as an active data carrier of a virtual memory drive such that no specific software to read the image is required on the part of the operating system.

The method may comprise comparing an image currently stored in the non-volatile bulk memory with an image stored at the predetermined network source, wherein downloading is performed only if a difference was determined in comparing. Such a comparison makes it possible to ensure that there is always a current version of the image stored by the network source on the computer system. At the same time, multiple downloading of the same image is avoided.

Downloading and/or incorporating may be initiated by a time scheduling component of the service processor. This makes it possible, for example, for a process of downloading an extensive image to be carried out completely or partly at times of low load such as at night, for instance.

Incorporating may involve incorporating the image of a bootable data carrier as active data carrier. In this case, the method additionally may comprise changing the boot order of the computer system such that the next boot operation is carried out by the virtual memory drive; and booting the computer system from the active, bootable data carrier. These steps enable the computer system to be booted completely under the control of an operating system stored on the transmitted image. By way of example, it is possible to start a computer system for maintenance purposes under a different or differently configured operating system than is stored on a different local bulk memory of the computer system.

The method may comprise selecting an image of a data carrier from a plurality of stored images, wherein incorporating involves incorporating the selected image as active data carrier. Given corresponding storage capacity of the non-volatile bulk memory, different images, for example, for different maintenance tasks, can be kept available. By simple selection, it is then possible to choose between different virtual data carriers.

We also provide a computer system with a main processor that executes an operating system, a service processor, which is operable independently of the main processor and the operating system, and a first non-volatile bulk memory coupled to the service processor. In this case, the service processor downloads at least one image of a data carrier from a predetermined network source and stores it in the first non-volatile bulk memory. The service processor furthermore incorporates the at least one stored image as active data carrier of a virtual memory drive of the computer system and emulates a standard interface to access the virtual memory drive. In this way, a correspondingly designed operating system can access the active data carrier without manufacturer-specific driver software.

The computer system may substantially enable realization of the advantages of the method.

The first non-volatile bulk memory may be a flash memory component permanently connected to the computer, or an exchangeable flash memory card. Such memory media can be addressed by a service processor in a simple manner and allow non-volatile and cost-effective storage of extensive data.

The computer system may comprise a second non-volatile bulk memory, in particular a hard disk drive, to store the operating system, the second non-volatile bulk memory being coupled to the main processor. Providing different bulk memories to store the image, on the one hand, and the operating system, on the other hand, makes it possible to prevent the two systems from influencing one another with regard to memory space.

At least one of the following images may be stored in the first non-volatile bulk memory: an image of a data carrier that installs an operating system on the computer system, an image of a data carrier that restores a previous state of the computer system, and an image of a data carrier that maintains the computer system.

The service processor may incorporate the stored image into the computer system in a read-only mode of operation, in particular as a data carrier of a virtual CD or DVD drive. Such incorporation allows most operating systems to have standard-conforming access to the active data carrier. In addition, the operating system is prevented from altering data stored on the active data carrier. The integrity of the active data carrier remains ensured in this way.

The computer system may comprise a firmware component to start the computer system from a predetermined memory device, wherein the service processor selects the virtual memory drive as a memory device to start the computer system for the firmware component such that the computer system boots from the active data carrier after a restart. Such a firmware component enables the virtual memory medium to be offered to the corresponding computer system as a boot memory medium as early as during booting.

We further provide a memory device having executable program code stored thereon. Execution of the program code by a service processor of a computer system involves the service processor downloading at least one image of a data carrier from a predetermined network source, storing it in a non-volatile bulk memory and incorporating it as an active data carrier of a virtual memory drive. In addition, the service processor emulates a standard interface that accesses the virtual memory drive such that an operating system of the computer system can access the active data carrier without manufacturer-specific driver software.

The executable program code of the memory device may program a service processor to perform a method and, respectively, set up a computer system.

Further advantages are disclosed in the appended claims and figures and the following description of examples.

FIG. 1 shows a computer system 1 in accordance with one example. In particular, the computer system 1 in accordance with FIG. 1 is a so-called server computer such as is used in computer centers, for example. The computer system 1 comprises a system component 2 having a plurality of components installed thereon. By way of example, the system component 2 is a motherboard of the computer system 1.

A main processor 3 and a service processor 4 are arranged on the system component 2. By way of example, the main processor 3 is a powerful microprocessor from Intel, for example, an Intel® Xeon® processor. By way of example, the service processor 4 is a so-called intelligent remote management controller (iRMC). Such service processors are in some instances also known by the term "baseboard management controller" (BMC) or the term "system management component" (SMB). The service processor 4 inter alia monitors the correct operation of the computer system 1 and performs remote maintenance tasks independently of the main processor 3. By way of example, the computer system 1 can be switched on or off using the service processor 4 via a management network.

The main processor 3 and the service processor 4 connect to further components of the computer system 1 via one or a plurality of bus systems or coupling elements. In the example, a chipset 5 is used to connect the main processor 3 and the service processor 4 to a memory component for a Basic Input Output System, BIOS, 6, an input/output controller 7 and a network controller 8.

Furthermore, the service processor 4 connects to a memory card 10 via a dedicated connection 9. This is a so-called microSD flash memory card in accordance with the industry standard SDHC from the SD Card Association (http://www.sdcard.org). Alternatively, it is also possible to use a so-called eMMC card or some other non-volatile memory medium such as, for example, a flash memory permanently connected to the system component 2. The memory card 10 serves for the non-volatile storage of extensive data of the service processor 4, for example, amounting to 16 GB.

The network controller 8 of the computer system 1 connects to a data network 11, for example, a local Ethernet company network. Furthermore, the service processor 4 connects either to a separate management network 13 via a further, optional network controller 12 or to the same data network 11 via the chipset 5 and the network controller 8. The management network 13 can also be a virtual network established on the same physical network as the data network 11.

The computer system 1 furthermore comprises a bulk memory drive 14 connected to the input/output controller 7. Inter alia, an operating system 15 for the computer system 1 is stored on the bulk memory drive 14. By way of example, the operating system 15 is the operating system Microsoft® Windows® Server 2012, which runs practical applications for the computer system 1. Accordingly, the operating system 15 is also referred to hereinafter as host or main operating system.

Finally, the computer system 1 comprises a main memory 16 into which program code and associated data for processing by the main processor 3 are loaded. Further components of the computer system 1 such as a power supply, for example, are not illustrated in FIG. 1 for reasons of clarity.

To afford a better understanding, the essential components of the hardware and software architecture of the service processor 4 are described below with reference to FIG. 2.

The service processor 4 maintains the computer system 1 during different phases, for example, when it is first set up and updated. A central component of the firmware thereof is a so-called application framework library 20, which uses a service operating system—not illustrated in FIG. 2—to provide various runtime services for software components running on the service processor 4. The service processor 4 runs a distribution—customized for embedded systems—of the free operating system Linux, which runs independently of the main operating system 15 of the main processor 3. Via the application framework library 20, individual software modules can centrally access different resources of the service processor 4. For this purpose, a plurality of libraries 21 to 24 are available. Inter alia, the application framework library 20 allows access to an XML library 21, a database library 22, a virtual memory media library 23 and an IPMI library 24 for system management. The IPMI library 24 can be used to read or alter settings of the BIOS 6, for example.

The application framework library 20 furthermore allows accesses to the management network 13 via a network interface 25. The accesses via the network interface 25 can take place using the known http or ftp protocols, for example. The network interface 25, for example, downloads extensive data from a repository server, as described later.

Furthermore, the application framework library 20 provides a communication interface 26 between the service processor 4 and the main processor 3, or a software component executed by the main processor 3, via a PCIe interface 27. By way of example, the communication interface 26 can be the so-called ServerView Common Command Interface (SCCI), via which manufacturer-specific commands for platform management are exchanged. The communication interface 26 or the physical PCIe interface 27 can be used in particular to exchange extensive data between the service processor 4 and the memory card 10 connected thereto and programs running on the main processor 3 such as an agent service 28, for example. Furthermore, the service processor 4 emulates, for the BIOS 6 and thus likewise for the operating system 15, a USB boot device that can be used, inter alia, to start the computer system 1 from the memory card 10. Both the communication interface 26 and a USB connection to the USB boot device are implemented as logical, so-called memory-mapped IO interfaces. Physically, the data required for them are exchanged via the PCIe interface 27 in this case.

Figure 2:
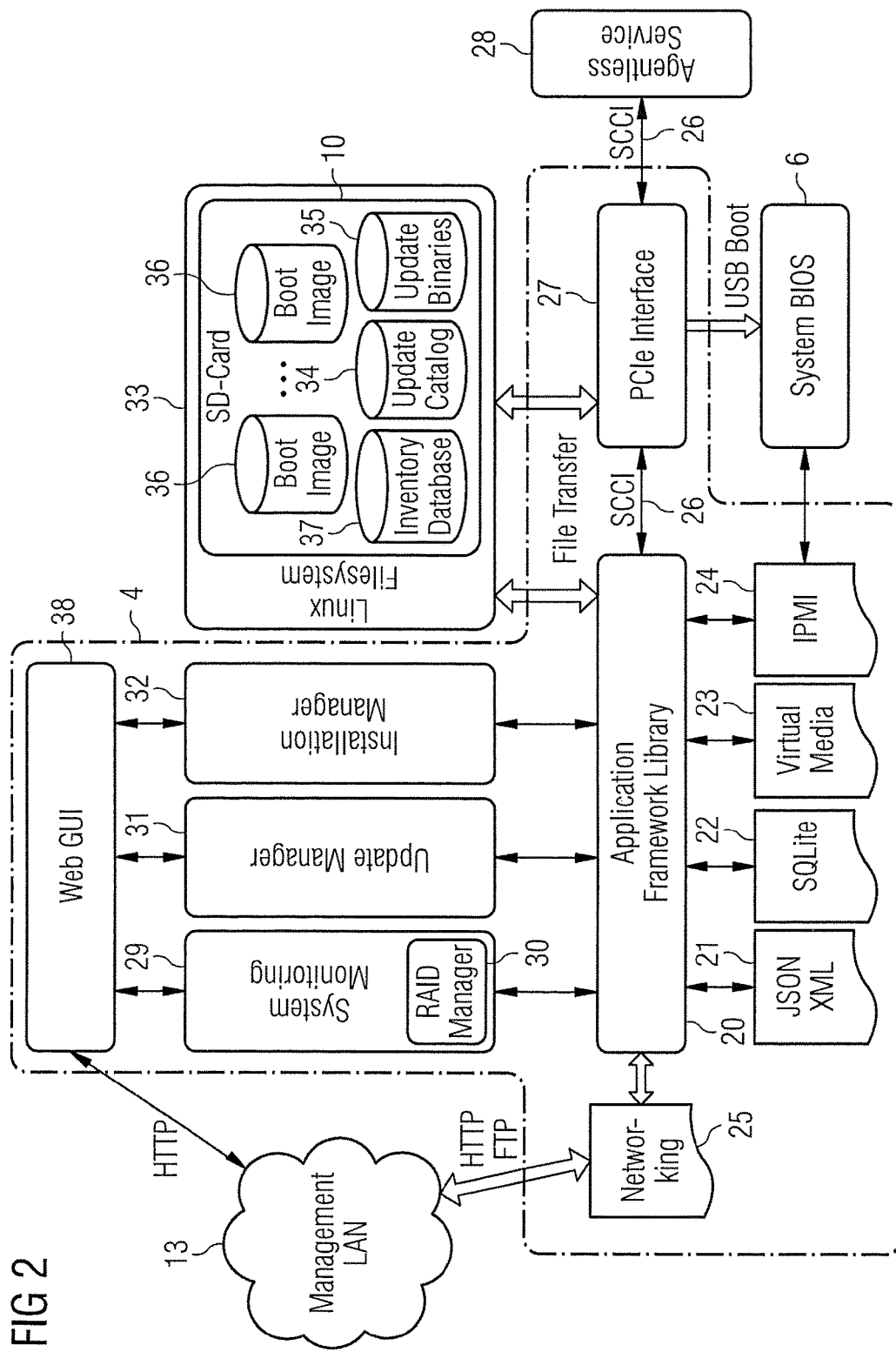
FIG. 2 shows a schematic illustration of components of a service processor.

In the example illustrated in FIG. 2, three different software components of the service processor 4 access the application framework library 20. A first component 29 in particular performs system monitoring. It comprises, inter alia, a RAID manager 30, that manages and monitors memory media. A second component in the form of an update manager 31 is responsible for procuring update packets (updates). A further component in the form of an installation manager 32 installs update packets procured by the update manager 31.

The components 29 to 32 and also other software components of the service processor 4 can access a file system 33 of the memory card 10 via the application framework library 20. Different data volumes 34, 35 and 36 are stored on the memory card 10. In this context, a data volume is understood to mean data or files stored in logically coherent fashion. By way of example, it is a data carrier volume of the memory card 10, a file with an image of a virtual data carrier or an archive with associated files. The data volumes 34 and 35 are images of a first virtual data carrier with an update catalog and respectively of a second virtual data carrier with update packets stored therein. The data volume 36 is images of different bootable, virtual data carriers such as the images of bootable CDs or DVDs, for example. Furthermore, an inventory list 37 or database with inventory information of the computer system 1 is also stored on the memory card 10. The inventory list 37 contains information pertaining to each component installed in the computer system 1 and additionally information pertaining to the installed software or firmware service of these components. By way of example, the inventory list 37 can be updated by the agent surface 28 or a software component specifically intended for this purpose.

The software components 29, 31 and 32 are managed by a system administrator via a web-based graphical user interface 38. To this end, the system administrator can access the user interface 38 via the management network 13, for example.

A method of providing at least one virtual data carrier for the computer system 1 is described below with reference to FIGS. 3 and 4. Such a data carrier can be used, for example, to install additional software on the computer system 1 or for other maintenance tasks.

Figure 3:
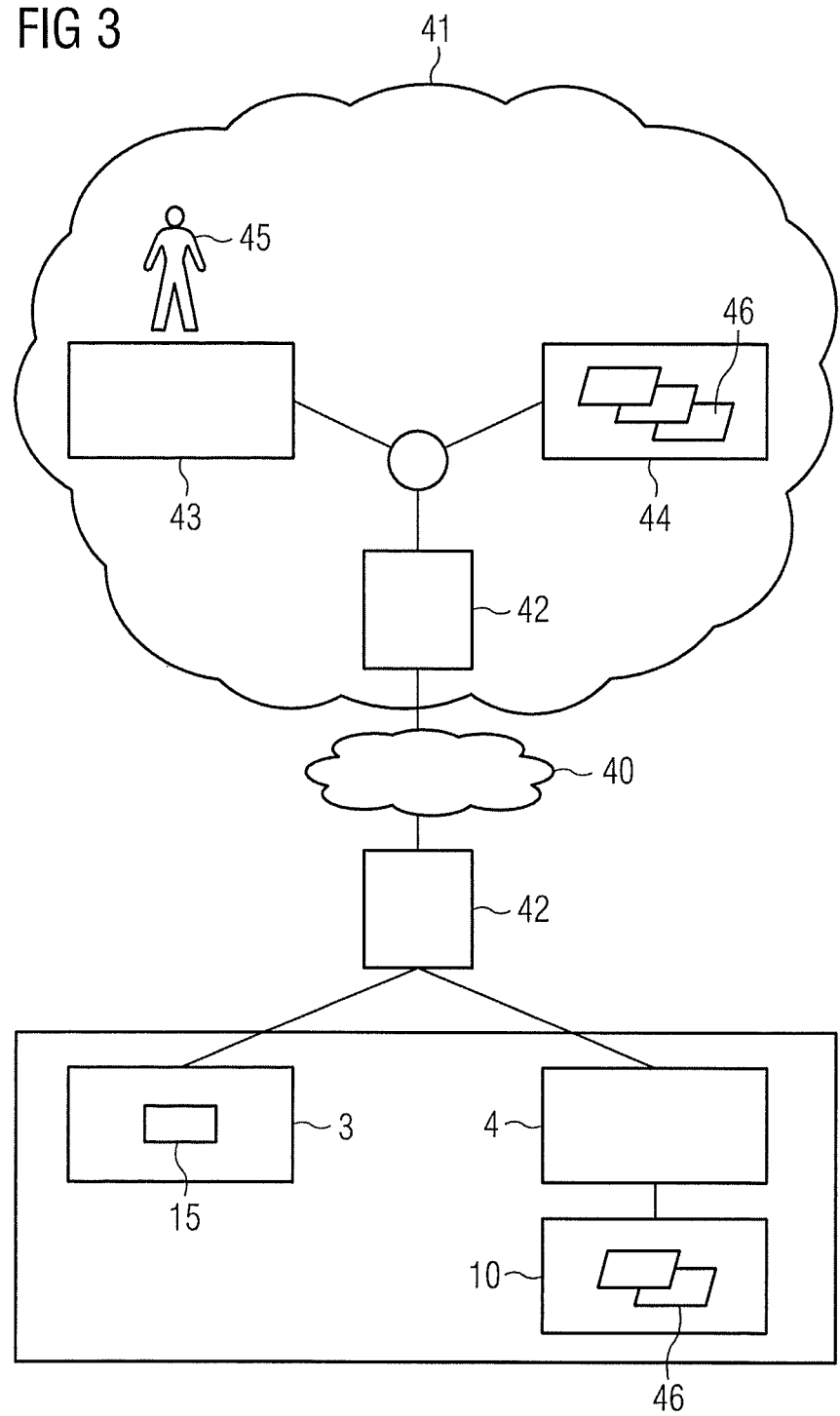
FIG. 3 shows a schematic illustration of the interplay between a managed computer system, a repository server and a management station.

In the example illustrated in FIG. 3, the computer system 1 connects to a remote network 41 via the Internet 40. A so-called firewall 42 is provided between the remote network 41 and the Internet 40 and also between the Internet 40 and the data network 12 and, respectively, the management network 13 to avoid unauthorized accesses from the Internet 40. The remote network 41 contains a management station 43 and a repository server 44.

An administrator 45 uses the management station 43 for remote maintenance of the computer system 1. For this purpose, the administrator prepares one or a plurality of images 46 of a data carrier, for example, of a bootable CD or DVD, and stores them on the repository server 44. Since the repository server 44 and the management station 43 are situated in the same physical network 41, the administrator 45 can rapidly store comparatively large amounts of data on the repository server 44. Alternatively, the administrator can also simply select a suitable network source with an image 46 stored thereon. By way of example, the administrator can determine a URL of a publicly accessible ftp server. The administrator subsequently accesses the service processor 4 of the computer system 1 via the management station 43, the Internet 40 and the management network 13 and requests the service processor to download the image 46 stored on the repository server 44 or at the determined URL. The service processor 4 subsequently contacts the repository server 44 or the determined URL and stores the image 46 downloaded therefrom on the memory card 10.

The download takes place independently of the connection of the administrator 45 and the operation of the operating system 15 of the computer system 1. Accordingly, the bandwidth of the Internet connection 40 for the data transfer is of less importance than if an administrator 45 transferred the ISO image 46 directly to the computer system 1. The administrator 45 can carry out other tasks, for example, in the time duration required to transfer the image 46.

If the transfer has been performed successfully, the administrator 45 can log on to the service processor 4 or to the operating system 15 of the computer system 1 via the Internet 40 and then carry out maintenance tasks on the computer system 1 with the aid of the locally available image 46. Alternatively, the administrator or some other user can also locally log on to the computer system 1 and use the image 46 that is then likewise present locally.

Figure 4:
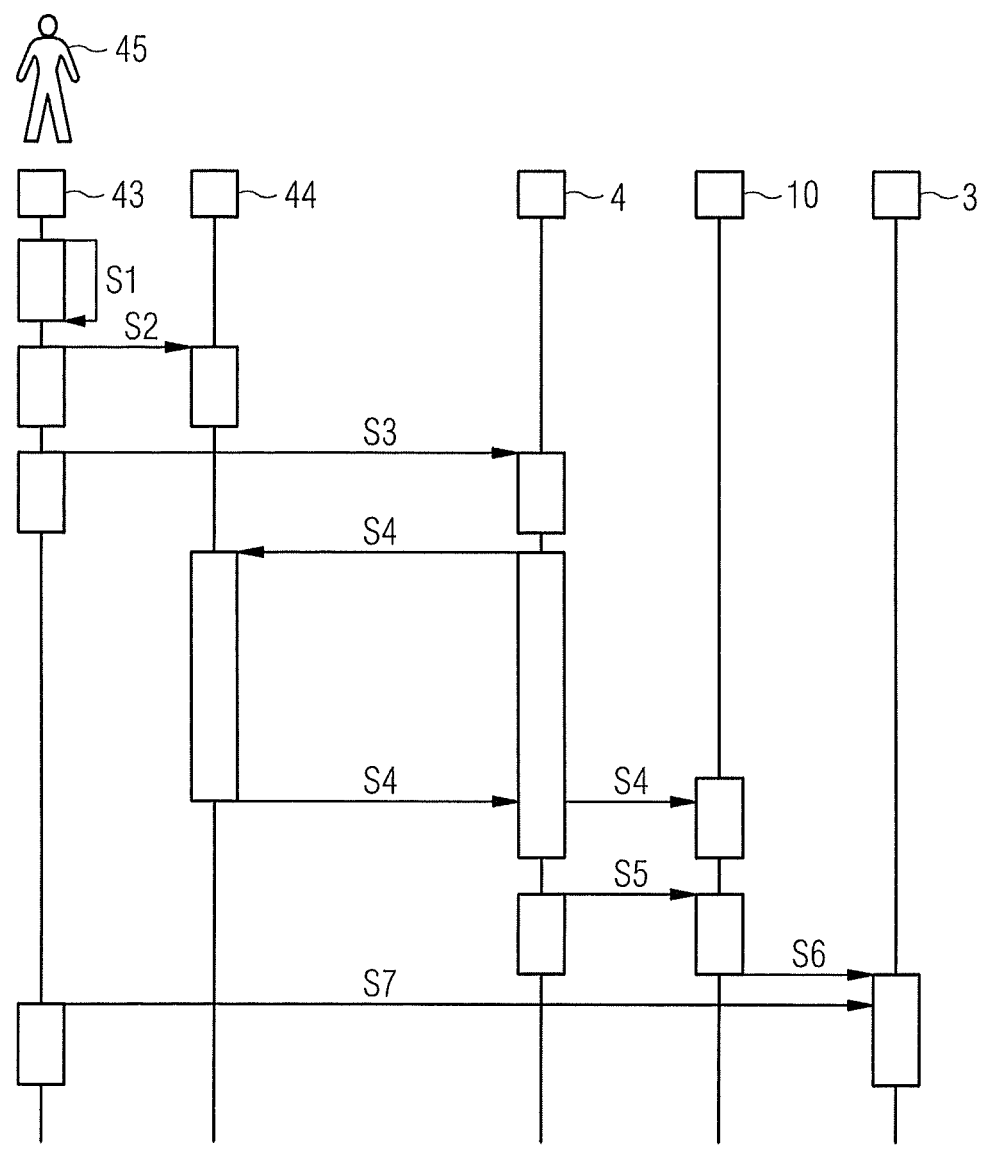
FIG. 4 shows a collaboration diagram of a method of providing at least one data carrier.

FIG. 4 shows the above-described method in detail on the basis of a collaboration diagram.

In a first step S1, the administrator 45 provides an image of a virtual data carrier. The image 46 can be, for example, an image—generated by the administrator 45—of a physically present data carrier, for example, of an installation CD or recovery CD of an operating system or an image compiled by the administrator 45 himself/herself and having the administrator's preferred maintenance programs and associated data. If appropriate, the administrator 45 can also provide a plurality of such images 46 in step S1.

In step S2, the images 46 compiled by the administrator 45 are stored on a repository server 44. By way of example, the repository server 44 can be a conventional FTP server or some other storage source that can be reached via a network.

In step S3, the administrator 45 logs on to the graphical user interface 38 of the service processor 4. Via the graphical user interface 38, the administrator can set up, for example, a time schedule to download the images 46 stored on the repository server 44.

Furthermore, in step S3, the administrator 45 can set up a time schedule to activate the downloaded images 46 by the service processor 4. Once these steps have been completed, the administrator 45 can log off from the user interface 38 of the service processor 4 and turn to other tasks.

To regularly change contents such as, for example, data carriers with a backup set to restore a driver of the computer system 1, the administrator 45 can also set up a time schedule for regular adjustment between the repository server 44 and the service processor 4. In this case, the service processor 4 regularly compares an image 46 locally stored on the memory card 10 with a corresponding image on the repository server 44, for example, on the basis of a change date, a CRC checksum or a digital signature. If changes are identified, the service processor 4 automatically downloads the changed image 46 or a changed part thereof and stores the updated image 46 on the memory card 10.

In a subsequent step S4, which either directly follows step S3 or is initiated by a time schedule predefined by the administrator, the service processor 4 starts to download one or a plurality of images 46 from the repository server 44. Particularly in remotely installed computer systems 1 connected to the repository server 44 via a data connection having a comparatively low transmission capacity, the download step S4 can take a considerable time. By way of example, the download of the image 46 or the images 46 of one or a plurality of DVDs with data that installs a new operating system can have a duration of a number of hours, days or even weeks.

The images 46 downloaded by the service processor 4 are stored on the memory card 10 connected to the service processor 4, for example, as data volume 34, 35 or 36. Alternatively, the images 46 can also be stored in an internal memory of the service processor 4, provided that this has a sufficient storage capacity. Consequently, the operating state of the main processor 3 and the bulk memory drive 14 of the computer system 1 is not of significance for the download. In particular, the download can also be continued at times when the main processor 3 of the computer system 1 is not in operation. Even in the event of a complete separation of the computer system 1 from either the data network 12, the management network 13 or a power supply, the download can be continued directly after the interruption has taken place. The data loaded up to that point remain stored on the non-volatile memory card 10 independently of the power supply.

In step S5, one of the previously downloaded images 46 is activated by the service processor 4. In this context, activate means that the image 46 is incorporated into a file system of the service processor 4. For this purpose, the application framework library 20 accesses one of the data volumes 34 to 36, for example, via the virtual media library 23. The data contained therein are made available to the BIOS 6 or to the operating system 15 via a virtual CD or DVD drive emulated by the service processor 4. The communication interface 26 to the main processor 3 is used for this purpose. Subsequently, applications and services running under the operating system 15 such as the agent service 28, for example, can access the data of the downloaded image 46 like a locally present memory medium.

If the image 46 is a bootable data carrier such as in the case of the data volume 36, for instance, the corresponding image 46 can be offered to the BIOS 6 of the computer system 1 as a USB boot device. In this case, the service processor 4 can initiate a restart of the computer system 1 as necessary. In a subsequent, optional step S6, the computer system 1 boots from the image 46 of the bootable data volume 36.

In a further step S7, the administrator 45 logs on to the computer system 1 now running and carries out the planned maintenance work. By way of example, the administrator can install a new operating system 15 on the computer system 1 or perform maintenance tasks. By way of example, the bulk memory drive 14 not used for the start can be checked for viruses or its content can be recovered from a backup set created earlier.

Besides the sequence mentioned above, a multiplicity of further scenarios are possible in which extensive data are compiled on images 46 of data carriers and are offered by a service processor 4 as data of a locally connected memory drive of a computer system 1.

Although the method and apparatus have been described in connection with specific forms thereof, it will be appreciated that a wide variety of equivalents may be substituted for the specified elements described herein without departing from the spirit and scope of this disclosure as described in the appended claims.

The invention claimed is:

1. A method of providing at least one data carrier for a computer system comprising:
   downloading at least one image of a data carrier from a predetermined network source that can be reached via a data network by a service processor of the computer system, said service processor being connected to a network controller for connecting the computer system to the data network, said service processor being operable independently of a main processor and an operating system of the computer system, the operating system being stored on a bulk memory drive of the computer system;
   storing, by the service processor, the at least one downloaded image in a non-volatile bulk memory device via a dedicated connection between the service processor and the non-volatile bulk memory device, wherein the non-volatile bulk memory device is a flash memory component permanently connected to the computer system or an exchangeable flash memory card, such that the step of storing is performed independent of the operating state of the main processor and of the bulk memory drive of the computer system;
   incorporating, by the service processor, the at least one stored image as active data carrier of a virtual memory drive; and
   emulating a standard interface that accesses the virtual memory drive such that an operating system can access the active data carrier without manufacturer-specific driver software.

2. The method according to claim 1, further comprising:
   comparing an image currently stored in the non-volatile bulk memory device with an image stored at the predetermined network source, wherein downloading is performed only if a difference was determined during comparing.

3. The method according to claim 1, wherein downloading and/or incorporating is initiated by a time scheduling component of the service processor.

4. The method according to claim 1, wherein the incorporating involves incorporating the image of a bootable data carrier as active data carrier, the method further comprising:
   changing boot order of the computer system such that a next boot operation is carried out by the virtual memory drive; and
   booting the computer system from the active, bootable data carrier.

5. The method according to claim 1, further comprising:
   selecting an image of a data carrier from a plurality of stored images, wherein the incorporating involves incorporating the selected image as active data carrier.

6. A computer system comprising:
   a bulk memory drive that stores an operating system;
   a main processor that executes the operating system;
   a service processor independently operable of the main processor and the operating system;
   a network controller connected to the service processor for connecting the computer system to a data network; and
   a non-volatile bulk memory device coupled to the service processor via a dedicated connection between the service processor and the non-volatile bulk memory device, wherein the non-volatile bulk memory device is a flash memory component permanently connected to the computer system or an exchangeable flash memory card, wherein the service processor downloads at least one image of a data carrier from a predetermined network source via the data network and stores the at least one image of the data carrier in the first non-volatile bulk memory device independently of the operating state of the main processor and of the bulk memory drive, incorporates the at least one stored image as active data carrier of a virtual memory drive of the computer system and emulates a standard interface that accesses the virtual memory drive such that an operating system can access the active data carrier without manufacturer-specific driver software.

7. The computer system according to claim 6, wherein the service processor stores a plurality of images on the first non-volatile bulk memory device and, in incorporating, incorporates an image selected by a selection component of the service processor from the plurality of images as active data carrier.

8. The computer system according to claim 6, wherein at least one of the following images is stored in the first non-volatile bulk memory device; an image of a data carrier that installs an operating system on the computer system, an image of a data carrier that restores a previous state of the computer system; and an image of a data carrier that maintains the computer system.

9. The computer system according to claim 6, wherein the service processor incorporates the stored image into the computer system in a read-only mode of operation as a data carrier of a virtual CD or DVD drive.

10. The computer system according to claim 6, further comprising a firmware component or a BIOS that starts the computer system from a predetermined memory device, wherein the service processor selects the virtual memory drive as memory device to start the computer system for the firmware component such that the computer system boots from the active data carrier after a restart.

11. The computer system according to claim 6, wherein the service processor comprises a time scheduling component that implements the process of downloading the at least one image, the process of incorporating the at least one stored image and/or a process of restarting the computer system in a time-controlled fashion.

12. A memory device having executable program code stored thereon, wherein execution of the program code by a service processor of a computer system causes the service processor to perform a process including:
downloading at least one image of a data carrier from a predetermined network source in a data network that can be reached via a network controller connected to the service processor for connecting the computer system to the data network;
storing the at least one downloaded image in a non-volatile bulk memory device via a dedicated connection between the service processor and the non-volatile bulk memory device, wherein the non-volatile bulk memory device is a flash memory component permanently connected to the computer system or an exchangeable flash memory card, such that the step of storing is performed independent of the operating state of a main processor and of a bulk memory drive storing an operating system of the computer system;
incorporating the at least one stored image as active data carrier of a virtual memory drive; and
emulating a standard interface that accesses the virtual memory drive such that an operating system of the computer system can access the active data carrier without manufacturer-specific driver software.

13. The method according to claim 1, further comprising:
regularly comparing, by the service processor, the at least one image of the data carrier stored in the non-volatile bulk memory device with a corresponding image stored by the predetermined network source;
if at least one change is identified in the comparison, downloading, by the service processor, the changed at least one image or a changed part of at least one image from the predetermined network source and storing the changed at least one image or the changed part of at least one image in the non-volatile bulk memory device.

14. The method according to claim 13, wherein the step of comparing is based on at least one of a change date, a CRC checksum or a digital signature of the at least one image of the data carrier.

15. The computer system according to claim 6, wherein the service processor regularly compares the at least one image of the data carrier stored in the non-volatile bulk memory device with a corresponding image stored by the predetermined network source, and, if at least one change is identified in the comparison, automatically downloads the changed at least one image or a changed part of at least one image from the predetermined network source and stores the changed at least one image or the changed part of at least one image in the non-volatile bulk memory device.

16. The computer system according to claim 15, wherein comparison is based on at least one of a change date, a CRC checksum or a digital signature of the at least one image of the data carrier.

17. The memory device according to claim 12, wherein the process further includes:
regularly comparing the at least one image of the data carrier stored in the non-volatile bulk memory device with a corresponding image stored by the predetermined network source;
if at least one change is identified in the comparison, downloading the changed at least one image or a changed part of at least one image from the predetermined network source and storing the changed at least one image or the changed part of at least one image in the non-volatile bulk memory device.

18. The memory device according to claim 17, wherein the comparing is based on at least one of a change date, a CRC checksum or a digital signature of the at least one image of the data carrier.

* * * * *